United States Patent
Barker et al.

(10) Patent No.: US 9,761,863 B2
(45) Date of Patent: Sep. 12, 2017

(54) DOPED NICKELATE COMPOUNDS

(71) Applicant: FARADION LIMITED, Sheffield (GB)

(72) Inventors: Jeremy Barker, Chipping Norton (GB); Richard Heap, Oxford (GB)

(73) Assignee: FARADION LIMITED, Sheffield (GB)

( * ) Notice: Subject to any disclaimer, the term of this patent is extended or adjusted under 35 U.S.C. 154(b) by 33 days.

(21) Appl. No.: 14/413,828

(22) PCT Filed: Jul. 9, 2013

(86) PCT No.: PCT/GB2013/051808
§ 371 (c)(1),
(2) Date: Jan. 9, 2015

(87) PCT Pub. No.: WO2014/009710
PCT Pub. Date: Jan. 16, 2014

(65) Prior Publication Data
US 2015/0214539 A1 Jul. 30, 2015

(30) Foreign Application Priority Data

Jul. 10, 2012 (GB) .................................. 1212268.5

(51) Int. Cl.
| | | |
|---|---|---|
| H01M 4/131 | (2010.01) | |
| H01M 4/525 | (2010.01) | |
| H01M 4/505 | (2010.01) | |
| H01M 4/485 | (2010.01) | |
| C01G 53/00 | (2006.01) | |
| G02F 1/155 | (2006.01) | |

(52) U.S. Cl.
CPC ............ *H01M 4/131* (2013.01); *C01G 53/42* (2013.01); *C01G 53/50* (2013.01); *C01G 53/66* (2013.01); *G02F 1/155* (2013.01); *H01M 4/485* (2013.01); *H01M 4/505* (2013.01); *H01M 4/525* (2013.01); *C01P 2002/50* (2013.01); *C01P 2006/40* (2013.01)

(58) Field of Classification Search
CPC ........... H01M 10/0525; H01M 10/054; H01M 4/505; H01M 4/525; C01G 53/42; C01G 53/50; C01G 53/66; C01P 2002/50; C01P 2002/72; C01P 2006/40
See application file for complete search history.

(56) References Cited

U.S. PATENT DOCUMENTS

| | | | |
|---|---|---|---|
| 4,246,253 | A | 1/1981 | Hunter |
| 5,135,732 | A | 8/1992 | Barboux et al. |
| 6,203,946 | B1 | 3/2001 | Barker et al. |
| 6,387,568 | B1 | 5/2002 | Barker et al. |
| 2002/0142225 | A1 | 10/2002 | Kweon et al. |
| 2002/0192148 | A1 | 12/2002 | Kweon et al. |
| 2003/0003361 | A1 | 1/2003 | Sunagawa et al. |
| 2003/0180616 | A1 | 9/2003 | Johnson et al. |
| 2005/0008563 | A1 | 1/2005 | Naruoka |
| 2005/0130042 | A1 | 6/2005 | Liu et al. |
| 2005/0202316 | A1 | 9/2005 | Hwang et al. |
| 2006/0194114 | A1 | 8/2006 | Saito |
| 2007/0218361 | A1 | 9/2007 | Inoue et al. |
| 2007/0224506 | A1 | 9/2007 | Ooyama et al. |
| 2009/0159838 | A1 | 6/2009 | Okada et al. |
| 2009/0290287 | A1 | 11/2009 | Lipka et al. |
| 2010/0173202 | A1 | 7/2010 | Saito |
| 2012/0028128 | A1 | 2/2012 | Seino et al. |
| 2012/0070743 | A1 | 3/2012 | Kwon et al. |

(Continued)

FOREIGN PATENT DOCUMENTS

| | | |
|---|---|---|
| CN | 1389941 A | 1/2003 |
| CN | 1225045 C | 10/2005 |

(Continued)

OTHER PUBLICATIONS

Search Report issued by the State Intellectual Property Office of the People's Republic of China, in connection with Chinese Patent Application No. 2013800363719, dated Sep. 22, 2015.
Search Report issued by the State Intellectual Property Office of the People's Republic of China, in connection with Chinese Patent Application No. 2013800363390, dated Sep. 14, 2015.
Search Report issued by the State Intellectual Property Office of the People's Republic of China, in connection with Chinese Patent Application No. 2013800363653, dated Aug. 25, 2015.
Second Office Action issued by the Chinese Patent Office on Mar. 18, 2016, in connection with Chinese Application No. 201380036339.0.
Search Report issued in connection with Chinese Patent Application No. 201380036360.0, dated Aug. 5, 2015.
First Office Action issued in connection with Chinese Patent Application No. 201380036360.0, dated Aug. 20, 2015.

(Continued)

*Primary Examiner* — Carlos Barcena
(74) *Attorney, Agent, or Firm* — Meunier Carlin & Curfman LLC

(57) ABSTRACT

The invention relates to novel materials of the formula: $A_u M^1_v M^2_w M^3_x M^4_y M^5_z O_2$ wherein A comprises one or more alkali metals selected from lithium, sodium and potassium; $M^1$ is nickel in oxidation state +2 $M^2$ comprises a metal in oxidation state +4 selected from one or more of manganese, titanium and zirconium; $M^3$ comprises a metal in oxidation state +2, selected from one or more of magnesium, calcium, copper, zinc and cobalt; $M^4$ comprises a metal in oxidation state +4, selected from one or more of titanium, manganese and zirconium; $M^5$ comprises a metal in oxidation state +3, selected from one or more of aluminum, iron, cobalt, molybdenum, chromium, vanadium, scandium and yttrium; further wherein U is in the range $1<U<2$; V is in the range $0.25<V<1$; W is in the range $0<W<0.75$; X is in the range $0 \leq X<0.5$; Y is in the range $0 \leq Y<0.5$; Z is in the range $0 \leq Z<0.5$; and further wherein $(U+V+W+X+Y+Z) \leq 3$. Such materials are useful, for example, as electrode materials in sodium and/or lithium ion battery applications.

13 Claims, 13 Drawing Sheets

(56) References Cited

U.S. PATENT DOCUMENTS

| | | | |
|---|---|---|---|
| 2012/0164533 A1 | 6/2012 | Senoue et al. |
| 2012/0183837 A1 | 7/2012 | Johnson et al. |
| 2012/0292561 A1 | 11/2012 | Sasaoka et al. |
| 2012/0315530 A1 | 12/2012 | Kageura |

FOREIGN PATENT DOCUMENTS

| | | | |
|---|---|---|---|
| CN | 100521359 C | 7/2009 |
| CN | 102341941 A | 2/2012 |
| EP | 1130665 A1 | 9/2001 |
| EP | 2211405 A1 | 7/2010 |
| EP | 2323204 A1 | 5/2011 |
| EP | 2416411 A1 | 2/2012 |
| EP | 2541651 A1 | 1/2013 |
| WO | 2010107084 A1 | 9/2010 |
| WO | 2011089958 A1 | 7/2011 |
| WO | 2011102497 A1 | 8/2011 |
| WO | 02097907 A2 | 12/2012 |
| WO | 2013140174 A2 | 9/2013 |

OTHER PUBLICATIONS

Antolini, Ermete, "The Stability of Molten Carbonate Fuel Cell Electrodes: A Review of Recent Improvements," Energy, 2011, vol. 88, pp. 4274-4293.

Great Britain Intellectual Property Office Search Report for Great Britain Patent Application No. GB1218047.7, dated Feb. 19, 2013.

Great Britain Intellectual Property Office Further Search Report for Great Britain Patent Application No. GB1218047.7, dated Nov. 11, 2013.

International Search Report and Written Opinion, mailed Feb. 27, 2014, in International Application No. PCT/GB2013/052620.

International Preliminary Report on Patentability, mailed Nov. 26, 2014, and Applicant's Demand Under PCT Article 31, dated Jun. 27, 2014, in International Application No. PCT/GB2013/052620.

Communication pursuant to Article 94(3) EPC issued by the European Patent Office on Feb. 22, 2016, in connection with European Application No. 13789884.7.

Komaba, et al., "Electrochemical Na Insertion and Solid Electrolyte Interphase for Hard-Carbon Electrodes and Application to Na-Ion Batteries," Advanced Functional Materials, 2011, vol. 21, pp. 3859-3867.

Padhi, et al., "Phospho-olivines as Positive-Electrode Materials for Rechargeable Lithium Batteries," Journal of Electrochemical Society, Apr. 1997, vol. 144, No. 4, pp. 1188-1194.

Toprakci, et al., "Fabrication and Electrochemical Characteristics of $LiFePO_4$ Powders for Lithium-Ion Batteries," KONA Powder and Particle Journal, 2010, No. 28, pp. 50-73.

Great Britain Intellectual Property Office Search Report for Great Britain Patent Application No. GB1212261.0, dated Oct. 23, 2012.

International Search Report and Written Opinion, mailed Oct. 9, 2013, in International Application No. PCT/GB2013/051822.

International Preliminary Report on Patentability, mailed Jun. 16, 2014, in International Application No. PCT/GB2013/051822.

Response to International Search Report and Written Opinion, dated Dec. 4, 2013, in International Application No. PCT/GB2013/051822.

International Search Report and Written Opinion, mailed Oct. 9, 2013, in International Application No. PCT/GB2013/051821.

International Preliminary Report on Patentability, mailed Jun. 16, 2014, in International Application No. PCT/GB2013/051821.

Response to International Search Report and Written Opinion, dated Dec. 4, 2013, in International Application No. PCT/GB2013/051821.

Great Britain Intellectual Property Office Search Report for Great Britain Patent Application No. GB1212263.6, dated Oct. 30, 2012.

International Search Report and Written Opinion, mailed Oct. 9, 2013, in International Application No. PCT/GB2013/051824.

Response to International Search Report and Written Opinion, dated Dec. 4, 2013, in International Application No. PCT/GB2013/051824.

International Preliminary Report on Patentability, mailed Jun. 16, 2014, in International Application No. PCT/GB2013/051824.

Kim, J.-H., et al., "Electrochemical performance of $Li[Li_xNi(1-3x)/2Mn(1+x)/2]O_2$ cathode materials synthesized by a sol-gel method," Journal of Power Sources, Elsevier Science B.V., vol. 119-121, 2003, pp. 166-170.

Great Britain Intellectual Property Office Search Report for Great Britain Patent Application No. GB1212268.5, dated Oct. 23, 2012.

International Search Report and Written Opinion, mailed Oct. 9, 2013, in International Application No. PCT/GB2013/051808.

International Preliminary Report on Patentability, mailed Jun. 20, 2014, and Applicant's Demand Under PCT Article 31, dated Mar. 11, 2014, in International Application No. PCT/GB2013/051808.

Response to International Search Report and Written Opinion pursuant to PCT Article 19, dated Dec. 4, 2013, in International Application No. PCT/GB2013/051808.

Kim, D., et al., "Enabling Sodium Batteries Using Lithium-Substituted Sodium Layered Transition Metal Oxide Cathodes," Advanced Energy Materials, vol. 1, 2011, pp. 333-336.

Myung et al., Synthesis of $LiNi_{0.5}Mn_{0.5-x}Ti_xO_2$ by an Emulsion Drying Method and Effect of Ti on Structure and Electrochemical Properties, Chem. Mater. 17:p. 2427-2435, 2005.

Komaba et al., Inorganic. Chem. 51, 2012, 6211-6220.

Office Action issued in co-pending U.S. Appl. No. 14/430,000, Jun. 12, 2017.

XRD of $Na_{1.1}Ni_{0.3}Mn_{0.5}Mg_{0.05}Ti_{0.05}O_2$

XRD of $Na_{1.05}Ni_{0.4}Mn_{0.5}Mg_{0.025}Ti_{0.025}O_2$

DOPED NICKELATE COMPOUNDS

FIELD OF THE INVENTION

The present invention relates to novel doped nickelate compounds, their method of preparation, to novel electrodes which utilise an active material that comprises said doped nickelate compounds, and to the use of these electrodes, for example in an energy storage device.

BACKGROUND OF THE INVENTION

Sodium-ion batteries are analogous in many ways to the lithium-ion batteries that are in common use today; they are both reusable secondary batteries that comprise an anode (negative electrode), a cathode (positive electrode) and an electrolyte material, both are capable of storing energy, and they both charge and discharge via a similar reaction mechanism. When a sodium-ion (or lithium-ion battery) is charging, $Na^+$ (or $Li^+$) ions de-intercalate from the cathode and insert into the anode. Meanwhile charge balancing electrons pass from the cathode through the external circuit containing the charger and into the anode of the battery. During discharge the same process occurs but in the opposite direction.

Lithium-ion battery technology has enjoyed a lot of attention in recent years and provides the preferred portable battery for most electronic devices in use today; however lithium is not a cheap metal to source and is considered too expensive for use in large scale applications. By contrast sodium-ion battery technology is still in its relative infancy but is seen as advantageous; sodium is much more abundant than lithium and some researchers predict this will provide a cheaper and more durable way to store energy into the future, particularly for large scale applications such as storing energy on the electrical grid. Nevertheless a lot of work has yet to be done before sodium-ion batteries are a commercial reality.

$NaNi_{0.5}Mn_{0.5}O_2$ is a known Na-ion material in which the nickel is present as $Ni^{2+}$ while the manganese is present as $Mn^{4+}$. The material is ordered with the Na and Ni atoms residing in discrete sites within the structure. The nickel ions ($Ni^{2+}$) are a redox element which contributes to the reversible specific capacity and the manganese ions ($Mn^{4+}$) play the role of a structure stabilizer. Compound $NaNi_{0.5}Ti_{0.5}O_2$ is analogous to $NaNi_{0.5}Mn_{0.5}O_2$ in that the $Ni^{2+}$ ions provide the active redox centre and the $Ti^{4+}$ ions are present for structure stabilization. There is plenty of literature describing the preparation of $NaNi_{0.5}Mn_{0.5}O_2$ (and to a lesser extent $NaNi_{0.5}Ti_{0.5}O_2$) as the precursor for making $LiNi_{0.5}Mn_{0.5}O_2$ and $LiNi_{0.5}Ti_{0.5}O_2$ by Na→Li ion exchange for Li-ion applications. A direct synthesis method to make these Li materials yields undesirable disordered materials, for example, as a result of the lithium and nickel atoms sharing structural sites.

Recent electrochemical studies reported by Komaba et al Adv. Funct. Mater. 2011, 21, 3859 describe the sodium insertion performance of hard-carbon and layered $NaNi_{0.5}Mn_{0.5}O_2$ electrodes in propylene carbonate electrolyte solutions. The results obtained show that although $NaNi_{0.5}Mn_{0.5}O_2$ exhibits some reversible charging and discharging ability, the capacity of the material fades by 25% or more, after only 40 cycles.

Kim, Kang et al, Adv. Energy Mater. 2011, 1, 33-336 also discusses the preparation of a layered oxide material with a structure, normalised to $2O^{2-}$, of $Na_{0.85}Li_{0.17}Ni_{0.21}Mn_{0.64}O_2$ and its use to reversibly inter- calate sodium in a sodium cathode material. However, as this paper describes, this material only demonstrates modest electrochemical performance.

The present invention aims to provide novel compounds. Further, the present invention aims to provide a cost effective electrode that contains an active material that is straightforward to manufacture. Another aim of the present invention is to provide an electrode that has a high initial specific discharge capacity and which is capable of being recharged multiple times without significant loss in charge capacity.

Therefore, the first aspect of the present invention provides compounds of the formula:

$$A_U M^1{}_V M^2{}_W M^3{}_X M^4{}_Y M^5{}_Z O_2$$

wherein
A comprises one or more alkali metals selected from lithium, sodium and potassium;
$M^1$ is nickel in oxidation state +2
$M^2$ comprises a metal in oxidation state +4 selected from one or more of manganese, titanium and zirconium;
$M^3$ comprises a metal in oxidation state +2, selected from one or more of magnesium, calcium, copper, zinc and cobalt;
$M^4$ comprises a metal in oxidation state +4, selected from one or more of titanium, manganese and zirconium;
$M^5$ comprises a metal in oxidation state +3, selected from one or more of aluminium, iron, cobalt, molybdenum, chromium, vanadium, scandium and yttrium;
further wherein
U is in the range 1<U<2;
V is in the range 0.25<V<1;
W is in the range 0<W<0.75;
X is in the range 0≤X<0.5;
Y is in the range 0≤Y<0.5;
Z is in the range 0≤Z<0.5;
and further wherein (U+V+W+X+Y+Z)≤3.
Preferably (U+V+W+X+Y+Z)≤2.5.

Although A is defined as comprising one or more alkali metals selected from lithium, sodium and potassium, compounds in which A is one or more alkali metal comprising sodium and/or potassium either alone or in a mixture with lithium as a minor constituent are also part of the present invention.

Preferably the present invention provides a compound of the above formula wherein U is in the range 1<U<1.5; V is in the range 0.25<V<1, preferably 0.3<V<1; W is in the range 0<W<0.75; X is in the range 0≤X≤0.25; Y is in the range 0≤Y≤0.25; Z is in the range 0≤Z≤0.25.

Particularly preferred compounds of the above formula include:
$Na_{1.1}Ni_{0.35}Mn_{0.55}O_2$;
$Na_{1.05}Ni_{0.425}Mn_{0.525}O_2$;
$Li_{1.1}Ni_{0.35}Mn_{0.55}O_2$;
$Li_{1.05}Ni_{0.425}Mn_{0.525}O_2$;
$Na_{1.1}Ni_{0.3}Mn_{0.5}Al_{0.1}O_2$;
$Na_{1.05}Ni_{0.4}Mn_{0.5}Al_{0.05}O_2$;
$Li_{1.1}Ni_{0.3}Mn_{0.5}Al_{0.1}O_2$;
$Li_{1.05}Ni_{0.4}Mn_{0.5}Al_{0.05}O_2$;
$Na_{1.1}Ni_{0.3}Mn_{0.5}Mg_{0.05}Ti_{0.05}O_2$;
$Na_{1.05}Ni_{0.4}Mn_{0.5}Mg_{0.025}Ti_{0.025}O_2$;
$Na_{1.05}Ni_{0.4}Mn_{0.5}Mg_{0.025}Ti_{0.025}O_2$;
$Na_{1.5}Ni_{0.75}Mn_{0.25}O_2$;
$Na_{1.5}Ni_{0.75}Ti_{0.25}O_2$;
$Li_{1.5}Ni_{0.75}Mn_{0.25}O_2$;
$Li_{1.5}Ni_{0.75}Ti_{0.25}O_2$;
$Na_{1.1}Ni_{0.3}Ti_{0.05}Mg_{0.05}Mn_{0.5}O_2$;
$Na_{1.05}Ni_{0.4}Ti_{0.025}Mg_{0.025}Mn_{0.5}O_2$;

$Li_{1.1}Ni_{0.3}Ti_{0.05}Mg_{0.05}Mn_{0.5}O_2$;
$Li_{1.05}Ni_{0.4}Ti_{0.025}Mg_{0.025}Mn_{0.5}O_2$.

In a second aspect, the present invention provides an electrode comprising an active compound of the formula:

$$A_U M^1{}_V M^2{}_W M^3{}_X M^4{}_Y M^5{}_Z O_2$$

wherein
A comprises one or more alkali metals selected from lithium, sodium and potassium;
$M^1$ is nickel in oxidation state +2
$M^2$ comprises a metal in oxidation state +4 selected from one or more of manganese, titanium and zirconium;
$M^3$ comprises a metal in oxidation state +2, selected from one or more of magnesium, calcium, copper, zinc and cobalt;
$M^4$ comprises a metal in oxidation state +4, selected from one or more of titanium, manganese and zirconium;
$M^5$ comprises a metal in oxidation state +3, selected from one or more of aluminium, iron, cobalt, molybdenum, chromium, vanadium, scandium and yttrium;
further wherein
U is in the range 1<U<2;
V is in the range 0.25<V<1;
W is in the range 0<W<0.75;
X is in the range 0≤X<0.5;
Y is in the range 0≤Y<0.5;
Z is in the range 0≤Z<0.5;
and further wherein (U+V+W+X+Y+Z)≤3.
Preferably (U+V+W+X+Y+Z)≤2.5.

Although A is defined as comprising one or more alkali metals selected from lithium, sodium and potassium, compounds in which A is one or more alkali metals comprising sodium and/or potassium either alone or in a mixture with lithium as a minor constituent are also part of the present invention.

Preferably the present invention provides an electrode comprising an active compound of the above formula wherein U is in the range 1<U<1.5; V is in the range 0.25<V<1, preferably 0.3<V<1; W is in the range 0<W<0.75; X is in the range 0≤X≤0.25; Y is in the range 0≤Y≤0.25; Z is in the range 0≤Z≤0.25.

Especially preferred electrodes comprise active compounds selected from one or more of:
$Na_{1.1}Ni_{0.35}Mn_{0.55}O_2$;
$Na_{1.05}Ni_{0.425}Mn_{0.525}O_2$;
$Li_{1.1}Ni_{0.35}Mn_{0.55}O_2$;
$Li_{1.05}Ni_{0.425}Mn_{0.525}O_2$;
$Na_{1.1}Ni_{0.3}Mn_{0.5}Al_{0.1}O_2$;
$Na_{1.05}Ni_{0.4}Mn_{0.5}Al_{0.05}O_2$;
$Li_{1.1}Ni_{0.3}Mn_{0.5}Al_{0.1}O_2$;
$Li_{1.05}Ni_{0.4}Mn_{0.5}Al_{0.05}O_2$;
$Na_{1.1}Ni_{0.3}Mn_{0.5}Mg_{0.05}Ti_{0.05}O_2$;
$Na_{1.05}Ni_{0.4}Mn_{0.5}Mg_{0.025}Ti_{0.025}O_2$;
$Na_{1.05}Ni_{0.4}Mn_{0.5}Mg_{0.025}Ti_{0.025}O_2$;
$Na_{1.5}Ni_{0.75}Mn_{0.25}O_2$;
$Na_{1.5}Ni_{0.75}Ti_{0.25}O_2$;
$Li_{1.5}Ni_{0.75}Mn_{0.25}O_2$;
$Li_{1.5}Ni_{0.75}Ti_{0.25}O_2$;
$Na_{1.1}Ni_{0.3}Ti_{0.05}Mg_{0.05}Mn_{0.5}O_2$;
$Na_{1.05}Ni_{0.4}Ti_{0.025}Mg_{0.025}Mn_{0.5}O_2$;
$Li_{1.1}Ni_{0.3}Ti_{0.05}Mg_{0.05}Mn_{0.5}O_2$; and
$Li_{1.05}Ni_{0.4}Ti_{0.025}Mg_{0.025}Mn_{0.5}O_2$.

The electrodes according to the present invention are suitable for use in many different applications, for example energy storage devices, rechargeable batteries, electrochemical devices and electrochromic devices.

Advantageously, the electrodes according to the invention are used in conjunction with a counter electrode and one or more electrolyte materials. The electrolyte materials may be any conventional or known materials and may comprise either aqueous electrolyte(s) or non-aqueous electrolyte(s) or mixtures thereof.

In a third aspect, the present invention provides an energy storage device that utilises an electrode comprising the active materials described above, and particularly an energy storage device for use as one or more of the following: a sodium ion and/or lithium ion and/or potassium ion cell; a sodium metal and/or lithium metal and/or potassium metal ion cell; a non-aqueous electrolyte sodium ion and/or lithium ion and/or potassium ion cell; an aqueous electrolyte sodium ion and/or lithium ion and/or potassium ion cell.

The novel compounds of the present invention may be prepared using any known and/or convenient method. For example, the precursor materials may be heated in a furnace so as to facilitate a solid state reaction process.

A fourth aspect of the present invention provides a particularly advantageous method for the preparation of the compounds described above comprising the steps of:
a) mixing the starting materials together, preferably intimately mixing the starting materials together and further preferably pressing the mixed starting materials into a pellet;
b) heating the mixed starting materials in a furnace at a temperature of between 400° C. and 1500° C., preferably a temperature of between 500° C. and 1200° C., for between 2 and 20 hours; and
c) allowing the reaction product to cool.

Preferably the reaction is conducted under an atmosphere of ambient air, and alternatively under an inert gas.

It is also possible to prepare lithium-ion materials from the sodium-ion derivatives by converting the sodium-ion materials into lithium-ion materials using an ion exchange process.

Typical ways to achieve Na to Li ion exchange include:
1. Mixing the sodium-ion rich material with an excess of a lithium-ion material e.g. $LiNO_3$, heating to above the melting point of $LiNO_3$ (264° C.), cooling and then washing to remove the excess $LiNO_3$ and side reaction products;
2. Treating the Na-ion rich material with an aqueous solution of lithium salts, for example 1M LiCl in water; and
3. Treating the Na-ion rich material with a non-aqueous solution of lithium salts, for example LiBr in one or more aliphatic alcohols such as hexanol, propanol etc.

BRIEF DESCRIPTION OF THE DRAWINGS

The present invention will now be described with reference to the following figures in which.

DETAILED DESCRIPTION

Figure 1A:
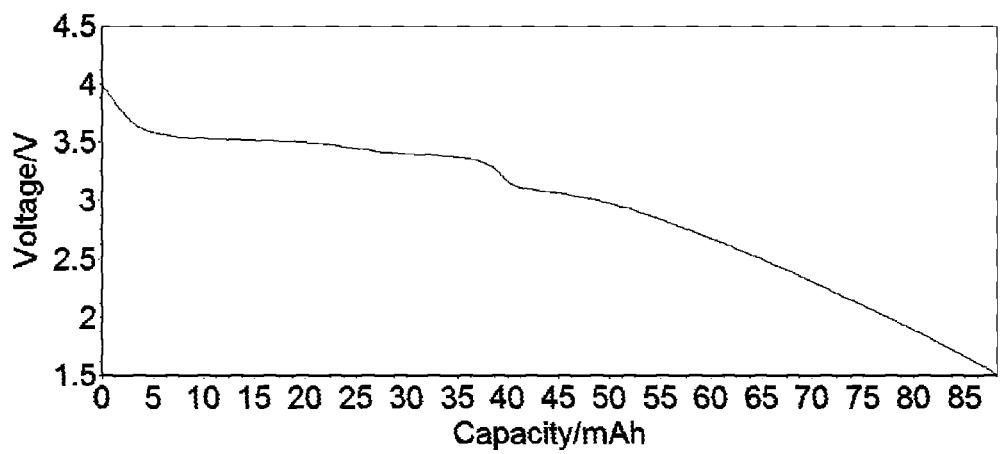
FIG. 1(A) relates to a Na-ion Cell and shows the third Cycle Discharge Voltage Profile (Na-ion Cell Voltage [V] versus Cathode Specific Capacity [mAh/g]) for a Hard Carbon//$Na_{1.10}Ni_{0.30}Mn_{0.50}Mg_{0.05}Ti_{0.05}O_2$ Cell.

The materials according to the present invention are prepared using the following generic method:

Generic Synthesis Method:

The required amounts of the precursor materials are intimately mixed together and pressed into a pellet. The resulting mixture is then heated in a tube furnace or a chamber furnace using either an ambient air atmosphere, or a flowing inert atmosphere (e.g. argon or nitrogen), at a furnace temperature of between 400° C. and 1500° C. until reaction product forms. For some materials a single heating step is used and for others (as indicated below in Table 1) more than one heating step is used. When cool, the reaction product is removed from the furnace and ground into a powder.

The above method was used to prepare a number of alkali-rich doped nickelates per Examples 1 to 4, as summarised below in Table 1:

TABLE 1

| EXAMPLE | TARGET COMPOUND | STARTING MATERIALS | FURNACE CONDITIONS |
|---|---|---|---|
| 1 | $Na_{1.1}Ni_{0.3}Mn_{0.5}Mg_{0.05}Ti_{0.05}O_2$ | $Na_2CO_3$, $NiCO_3$, $MnO_2$, $Mg(OH)_2$, $TiO_2$ | 1) Air/900° C., dwell time of 8 hours. 2) Air/900° C., dwell time of 8 hours. 3) Air/950° C., dwell time of 8 hours. |
| 2 | $Na_{1.05}Ni_{0.4}Mn_{0.5}Mg_{0.025}Ti_{0.025}O_2$ | $Na_2CO_3$, $NiCO_3$, $Mg(OH)_2$, $TiO_2$ | 1) Air/900° C., dwell time of 8 hours. 2) Air/900° C., dwell time of 8 hours. 3) Air/950° C., dwell time of 8 hours. |

TABLE 1-continued

| EXAMPLE | TARGET COMPOUND | STARTING MATERIALS | FURNACE CONDITIONS |
|---|---|---|---|
| 3 | $Na_{1.1}Ni_{0.3}Ti_{0.05}Mg_{0.05}Mn_{0.5}O_2$ | $Na_2CO_3$<br>$NiCO_3$<br>$Mg(OH)_2$<br>$MnO_2$ | Air/900° C., dwell time of 8 hours. |
| 4 | $Na_{1.05}Ni_{0.4}Ti_{0.025}Mg_{0.025}Mn_{0.5}O_2$ | $Na_2CO_3$<br>$NiCO_3$<br>$MnO_2$<br>$Mg(OH)_2$<br>$MnO_2$ | Air/900° C., dwell time of 8 hours. |

Product Analysis Using XRD

All of the product materials were analysed by X-ray diffraction techniques using a Siemens D5000 powder diffractometer to confirm that the desired target materials had been prepared, to establish the phase purity of the product material and to determine the types of impurities present. From this information it is possible to determine the unit cell lattice parameters.

The operating conditions used to obtain the XRD spectra illustrated in FIGS. 1A, 2A, 3A, 4A, 5 and 6A are as follows:
Slits sizes: 1 mm, 1 mm, 0.1 mm
Range: 2θ=5°-60°
X-ray Wavelength=1.5418 Å (Angstoms) (Cu Kα)
Speed: 0.5 seconds/step
Increment: 0.015°

Electrochemical Results

The target materials were tested either i) using a lithium metal anode test cell, or ii) using a Na-ion test cell using a hard carbon anode. It is also possible to test using a Li-ion cell with a graphite anode. Cells may be made using the following procedures:

Generic Procedure to Make a Lithium Metal Electrochemical Test Cell

The positive electrode is prepared by solvent-casting a slurry of the active material, conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 80% active material, 8% Super P carbon, and 12% Kynar 2801 binder. Optionally, an aluminium current collector may be used to contact the positive electrode. Metallic lithium on a copper current collector may be employed as the negative electrode. The electrolyte comprises one of the following: (i) a 1 M solution of $LiPF_6$ in ethylene carbonate (EC) and dimethyl carbonate (DMC) in a weight ratio of 1:1; (ii) a 1 M solution of $LiPF_6$ in ethylene carbonate (EC) and diethyl carbonate (DEC) in a weight ratio of 1:1; or (iii) a 1 M solution of $LiPF_6$ in propylene carbonate (PC) A glass fibre separator (Whatman, GF/A) or a porous polypropylene separator (e.g. Celgard 2400) wetted by the electrolyte is interposed between the positive and negative electrodes.

Generic Procedure to Make a Hard Carbon Na-Ion Cell

The positive electrode is prepared by solvent-casting a slurry of the active material, conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 80% active material, 8% Super P carbon, and 12% Kynar 2801 binder. Optionally, an aluminium current collector may be used to contact the positive electrode.

The negative electrode is prepared by solvent-casting a slurry of the hard carbon active material (Carbotron P/J, supplied by Kureha), conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 84% active material, 4% Super P carbon, and 12% Kynar 2801 binder. Optionally, a copper current collector may be used to contact the negative electrode.

Generic Procedure to Make a Graphite Li-Ion Cell

The positive electrode is prepared by solvent-casting a slurry of the active material, conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 80% active material, 8% Super P carbon, and 12% Kynar 2801 binder. Optionally, an aluminium current collector may be used to contact the positive electrode.

The negative electrode is prepared by solvent-casting a slurry of the graphite active material (Crystalline Graphite, supplied by Conoco Inc.), conductive carbon, binder and solvent. The conductive carbon used is Super P (Timcal). PVdF co-polymer (e.g. Kynar Flex 2801, Elf Atochem Inc.) is used as the binder, and acetone is employed as the solvent. The slurry is then cast onto glass and a free-standing electrode film is formed as the solvent evaporates. The electrode is then dried further at about 80° C. The electrode film contains the following components, expressed in percent by weight: 92% active material, 2% Super P carbon, and 6% Kynar 2801 binder. Optionally, a copper current collector may be used to contact the negative electrode.

Cell Testing

The cells are tested as follows using Constant Current Cycling techniques.

The cell is cycled at a given current density between pre-set voltage limits. A commercial battery cycler from Maccor Inc. (Tulsa, Okla., USA) is used. On charge, sodium (lithium) ions are extracted from the active material. During discharge, sodium (lithium) ions are re-inserted into the active material.

Results:

The data shown in FIGS. 1A, 1B, 1C and 1D are derived from the constant current cycling data for a $Na_{1.10}Ni_{0.30}Mn_{0.50}Mg_{0.05}Ti_{0.05}O_2$ active material in a Na-ion cell where this cathode material was coupled with a Hard Carbon (Carbotron P/J) anode material. The electrolyte used is a 0.5 M solution of $NaClO_4$ in propylene carbonate. The constant current data were collected at an approximate current density of 0.10 mA/cm² between voltage limits of 1.50 and 4.00 V. To ensure that the Na-ion cell was fully charged, the cell was potentiostatically held at 4.0 V at the end of the constant current charging process until the current density dropped to 20% of the constant current value. The testing was carried out at room temperature. During the cell charging process, sodium ions are extracted from the cathode active material, and inserted into the Hard Carbon anode. During the subsequent discharge process, sodium ions are extracted from the Hard Carbon and re-inserted into the cathode active material.

FIG. 1A shows the third cycle discharge voltage profile (Na-ion Cell Voltage [V] versus Cathode Specific Capacity [mAh/g]) for the Hard Carbon// $Na_{1.10}Ni_{0.30}Mn_{0.50}Mg_{0.05}Ti_{0.05}O_2$ cell. The cathode specific capacity in this cycle corresponds to 68 mAh/g.

Figure 1B:
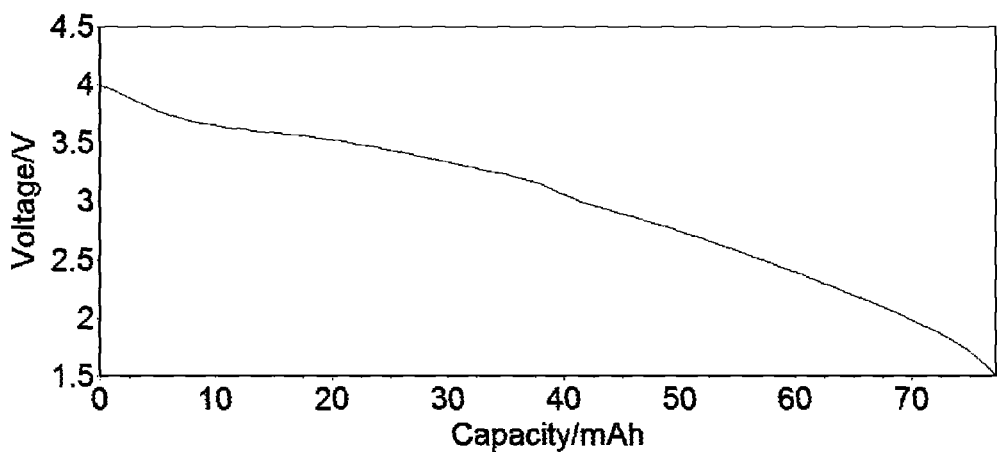
FIG. 1(B) relates to a Na-ion Cell and shows the third Cycle Differential Capacity Profiles (Differential Capacity [mAh/g/V] versus Na-ion Cell Voltage [V]) for a Hard Carbon//$Na_{1.10}Ni_{0.30}Mn_{0.50}Mg_{0.05}Ti_{0.05}O_2$ Cell.

FIG. 1B shows the third cycle differential capacity profiles (Differential Capacity [mAh/g/V] versus Na-ion Cell Voltage [V]) for the Hard Carbon// $Na_{1.10}Ni_{0.30}Mn_{0.50}Mg_{0.05}Ti_{0.05}O_2$ cell. These symmetrical data demonstrate the excellent reversibility of the ion extraction-insertion reactions in this Na-ion cell.

Figure 1C:
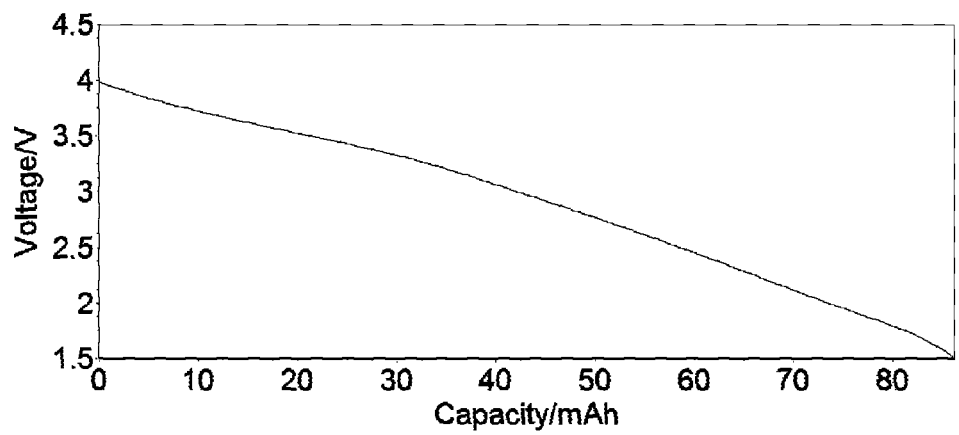
FIG. 1(C) relates to a Na-ion Cell and shows the Charge-Discharge Voltage Profiles for first 4 cycles (Na-ion Cell Voltage [V] versus Cumulative Cathode Specific Capacity [mAh/g]) for a Hard Carbon//$Na_{1.10}Ni_{0.30}Mn_{0.50}Mg_{0.05}Ti_{0.05}O_2$ Cell.

FIG. 1C shows the first four charge-discharge cycles (Na-ion Cell Voltage [V] versus Cumulative Cathode Specific Capacity [mAh/g]) for the Hard Carbon// $Na_{1.10}Ni_{0.30}Mn_{0.50}Mg_{0.05}Ti_{0.05}O_2$ cell. These data demonstrate that the level of voltage hysteresis (i.e. the voltage difference between the charge and discharge processes) is extremely small, indicating the excellent kinetics of the extraction-insertion reactions.

Figure 1D:
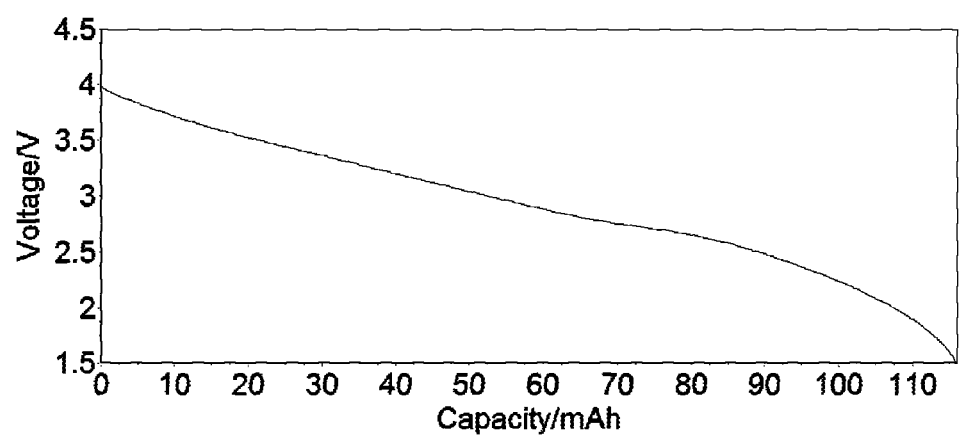
FIG. 1(D) relates to a Na-ion Cell and shows the Cycle Life Performance (Cathode Specific Capacity [mAh/g] versus Cycle Number) for a Hard Carbon//$Na_{1.10}Ni_{0.30}Mn_{0.50}Mg_{0.05}Ti_{0.05}O_2$ Cell.
Figure 1E:
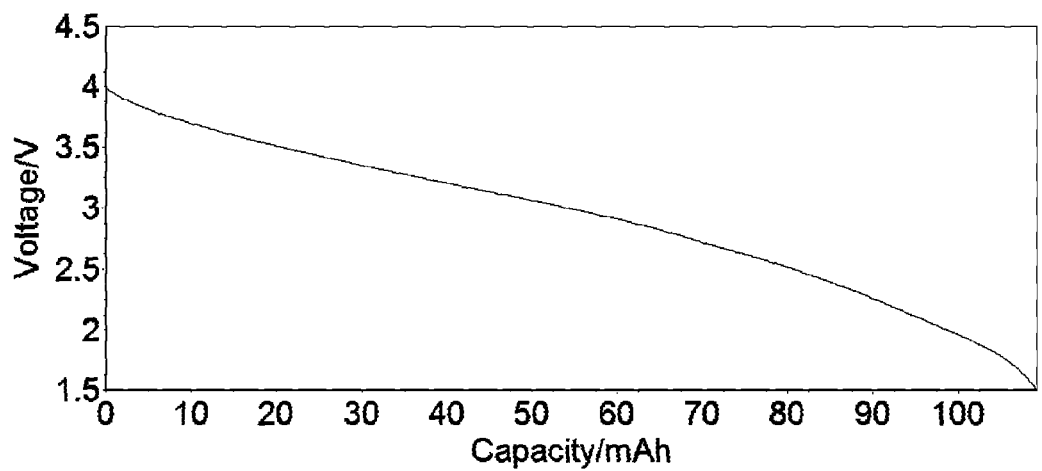
FIG. 1E relates to a Cycle Discharge Voltage Profile of a further embodiment of the invention.

FIG. 1D shows the cycle life performance (Cathode Specific Capacity [mAh/g] versus Cycle Number) for the Hard Carbon// $Na_{1.10}Ni_{0.30}Mn_{0.50}Mg_{0.05}Ti_{0.05}O_2$ cell. The cell shows excellent reversibility with the delivered cathode specific capacity increasing over the first 20 cycles. The cathode specific capacity reaches around 96 mAh/g after 25 cycles.

Referring to FIGS. 2A, 2B, 2C and 2D

The data shown in FIGS. 2A, 2B, 2C and 2D are derived from the constant current cycling data for a $Na_{1.05}Ni_{0.40}Mn_{0.50}Mg_{0.025}Ti_{0.025}O_2$ active material in a Na-ion cell where this cathode material was coupled with a Hard Carbon (Carbotron P/J) anode material. The electrolyte used is a 0.5 M solution of $NaClO_4$ in propylene carbonate. The constant current data were collected at an approximate current density of 0.10 mA/cm² between voltage limits of 1.50 and 4.00 V. To charge the Na-ion cell fully it was potentiostatically held at 4.0 V at the end of the constant current charging process until the current density dropped to 20% of the constant current value. The testing was carried out at room temperature. During the cell charging process, sodium ions are extracted from the cathode active material, and inserted into the Hard Carbon anode. During the subsequent discharge process, sodium ions are extracted from the Hard Carbon and re-inserted into the cathode active material.

Figure 2A:
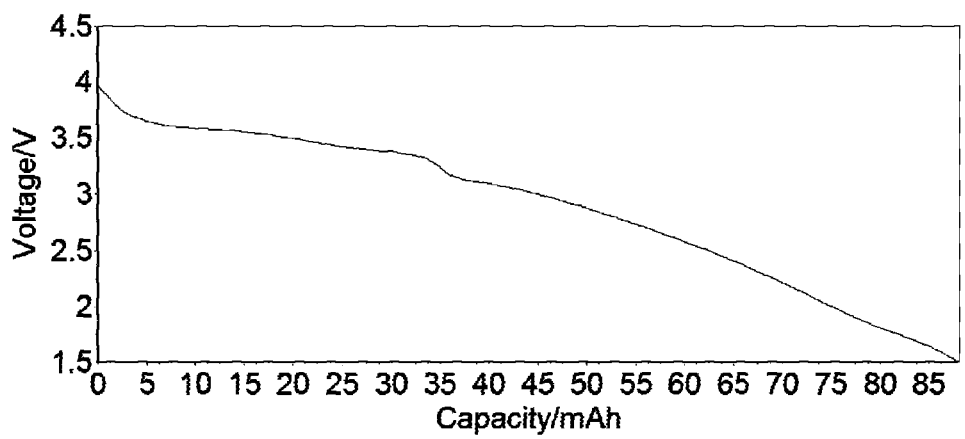
FIG. 2(A) relates to a Na-ion Cell and shows the third Cycle Discharge Voltage Profile (Na-ion Cell Voltage [V] versus Cathode Specific Capacity [mAh/g]) for a Hard Carbon//$Na_{1.05}Ni_{0.40}Mn_{0.50}Mg_{0.025}Ti_{0.025}O_2$ Cell.

FIG. 2A shows the third cycle discharge voltage profile (Na-ion Cell Voltage [V] versus Cathode Specific Capacity [mAh/g]) for the Hard Carbon// $Na_{1.05}Ni_{0.40}Mn_{0.50}Mg_{0.025}Ti_{0.025}O_2$ cell. The cathode specific capacity in this cycle corresponds to 88 mAh/g.

Figure 2B:
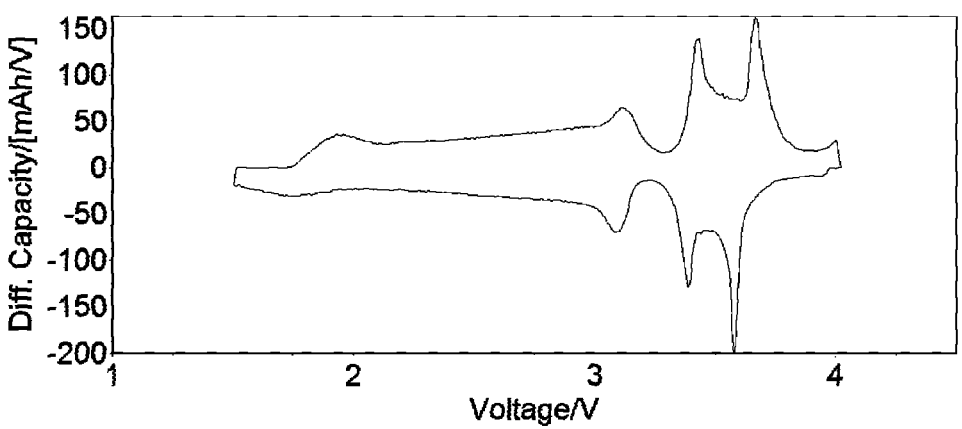
FIG. 2(B) relates to a Na-ion Cell and shows the third Cycle Differential Capacity Profiles (Differential Capacity [mAh/g/V] versus Na-ion Cell Voltage [V]) for a Hard Carbon//$Na_{1.05}/Ni_{0.40}Mn_{0.50}Mg_{0.025}Ti_{0.025}O_2$ Cell.

FIG. 2B shows the third cycle differential capacity profiles (Differential Capacity [mAh/g/V] versus Na-ion Cell Voltage [V]) for the Hard Carbon// $Na_{1.05}Ni_{0.40}Mn_{0.50}Mg_{0.025}Ti_{0.025}O_2$ cell. These symmetrical data demonstrate the excellent reversibility of the ion extraction-insertion reactions in this Na-ion cell.

Figure 2C:
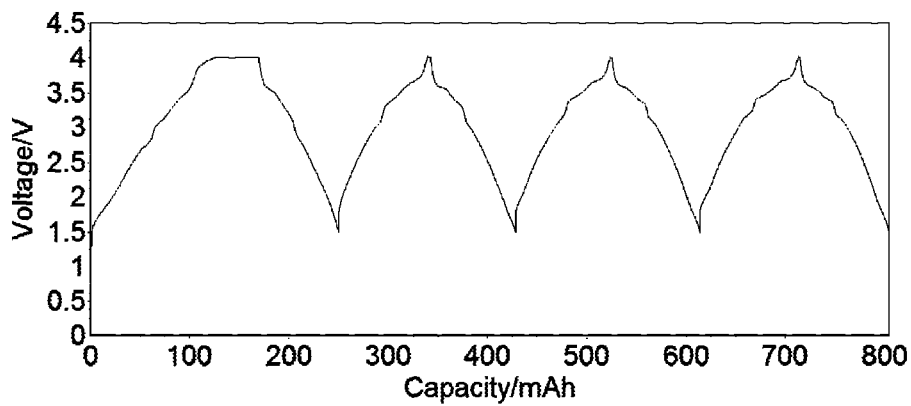
FIG. 2(C) relates to a Na-ion Cell and shows the Charge-Discharge Voltage Profiles for first 4 cycles (Na-ion Cell Voltage [V] versus Cumulative Cathode Specific Capacity [mAh/g]) for a Hard Carbon//$Na_{1.05}Ni_{0.40}Mn_{0.50}Mg_{0.025}Ti_{0.025}O_2$ Cell.

FIG. 2C shows the first four charge-discharge cycles (Na-ion Cell Voltage [V] versus Cumulative Cathode Specific Capacity [mAh/g]) for the Hard Carbon// $Na_{1.05}Ni_{0.40}Mn_{0.50}Mg_{0.025}Ti_{0.025}O_2$ cell. These data demonstrate that the level of voltage hysteresis (i.e. the voltage difference between the charge and discharge processes) is extremely small, indicating the excellent kinetics of the extraction-insertion reactions.

Figure 2D:
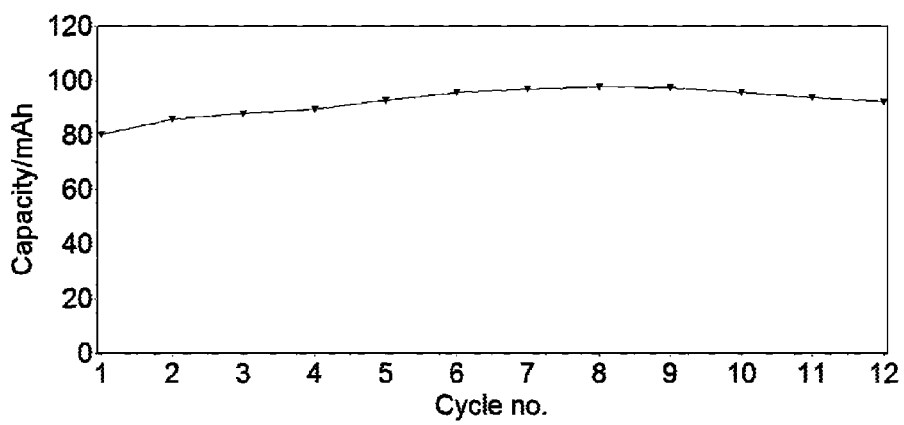
FIG. 2(D) relates to a Na-ion Cell and shows Cycle Life Performance (Cathode Specific Capacity [mAh/g] versus Cycle Number) for a Hard Carbon//$Na_{1.05}Ni_{0.40}Mn_{0.50}Mg_{0.025}Ti_{0.025}O_2$ Cell.

FIG. 2D shows the cycle life performance (Cathode Specific Capacity [mAh/g] versus Cycle Number) for the Hard Carbon// $Na_{1.05}Ni_{0.40}Mn_{0.50}Mg_{0.025}Ti_{0.025}O_2$ cell. The cell shows good reversibility with the delivered cathode specific capacity reaching around 96 mAh/g after 8 cycles.

Referring to FIGS. 3A, 3B, 3C and 3D

The data shown in FIGS. 3A, 3B, 3C and 3D are derived from the constant current cycling data for a $Na_{1.10}Ni_{0.30}Mn_{0.50}Mg_{0.05}Ti_{0.05}O_2$ active material in a Na-ion cell where this cathode material was coupled with a Hard Carbon (Carbotron P/J) anode material. The electrolyte used is a 0.5 M solution of $NaClO_4$ in propylene carbonate. The constant current data were collected at an approximate current density of 0.10 mA/cm² between voltage limits of 1.50 and 4.00 V. To charge the Na-ion cell fully, it was potentiostatically held at 4.0 V at the end of the constant current charging process until the current density dropped to 20% of the constant current value. The testing was carried out at room temperature. During the cell charging process, sodium ions are extracted from the cathode active material, and inserted into the Hard Carbon anode. During the subsequent discharge process, sodium ions are extracted from the Hard Carbon and re-inserted into the cathode active material.

Figure 3A:
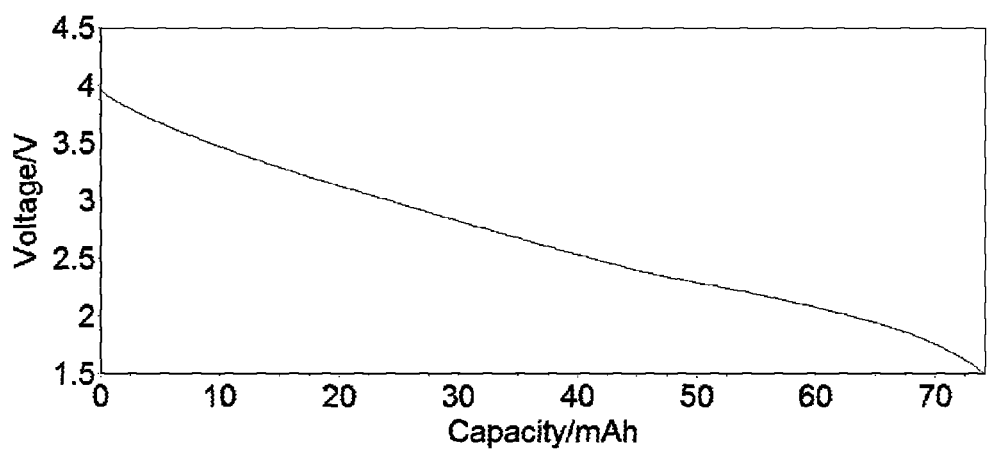
FIG. 3(A) relates to a Na-ion Cell and shows the third Cycle Discharge Voltage Profile (Na-ion Cell Voltage [V] versus Cathode Specific Capacity [mAh/g]) for a Hard Carbon//$Na_{1.10}Ni_{0.30}Mn_{0.50}Mg_{0.05}Ti_{0.05}O_2$ Cell.

FIG. 3A shows the third cycle discharge voltage profile (Na-ion Cell Voltage [V] versus Cathode Specific Capacity [mAh/g]) for the Hard Carbon// $Na_{1.10}Ni_{0.30}Mn_{0.50}Mg_{0.05}Ti_{0.05}O_2$ cell. The cathode specific capacity in this cycle corresponds to 75 mAh/g.

Figure 3B:
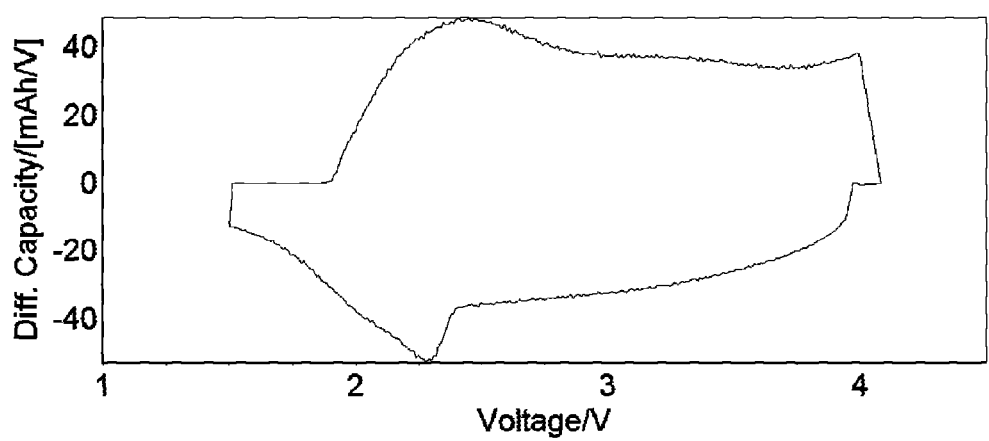
FIG. 3(B) relates to a Na-ion Cell and shows the third Cycle Differential Capacity Profiles (Differential Capacity [mAh/g/V] versus Na-ion Cell Voltage [V]) for a Hard Carbon//$Na_{1.10}Ni_{0.30}Mn_{0.50}Mg_{0.05}Ti_{0.05}O_2$ Cell.

FIG. 3B shows the third cycle differential capacity profiles (Differential Capacity [mAh/g/V] versus Na-ion Cell Voltage [V]) for the Hard Carbon// $Na_{1.10}Ni_{0.30}Mn_{0.50}Mg_{0.05}Ti_{0.05}O_2$ cell. These symmetrical data demonstrate the excellent reversibility of the ion extraction-insertion reactions in this Na-ion cell.

Figure 3C:
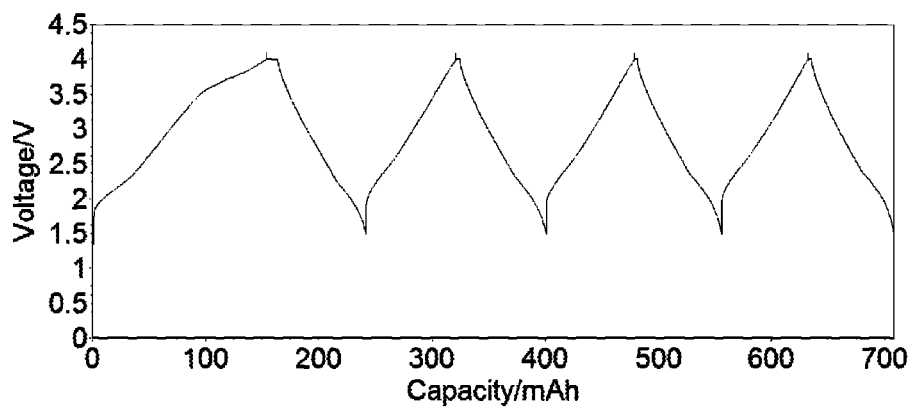
FIG. 3(C) relates to a Na-ion Cell and shows Charge-Discharge Voltage Profiles for first 4 cycles (Na-ion Cell Voltage [V] versus Cumulative Cathode Specific Capacity [mAh/g]) for a Hard Carbon//$Na_{1.10}Ni_{0.30}Mn_{0.50}Mg_{0.05}Ti_{0.05}O_2$ Cell.

FIG. 3C shows the first four charge-discharge cycles (Na-ion Cell Voltage [V] versus Cumulative Cathode Specific Capacity [mAh/g]) for the Hard Carbon// $Na_{1.10}Ni_{0.30}Mn_{0.50}Mg_{0.05}Ti_{0.05}O_2$ cell. These data demonstrate that the level of voltage hysteresis (i.e. the voltage difference between the charge and discharge processes) is extremely small, indicating the excellent kinetics of the extraction-insertion reactions.

Figure 3D:
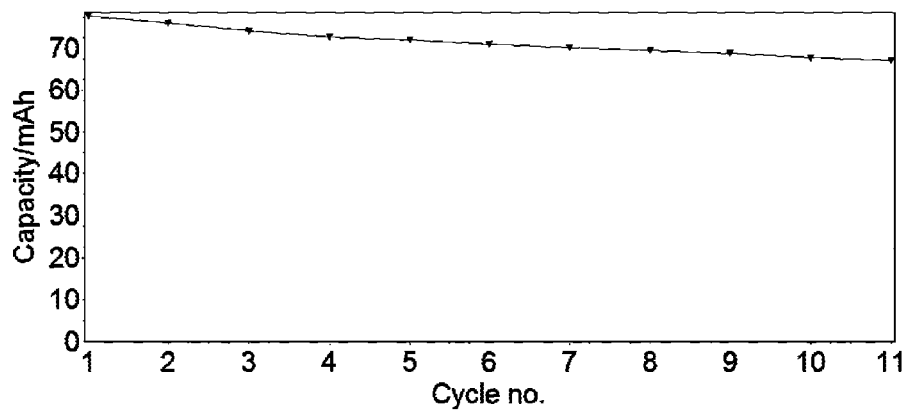
FIG. 3(D) relates to a Na-ion Cell and shows Cycle Life Performance (Cathode Specific Capacity [mAh/g] versus Cycle Number) for a Hard Carbon//$Na_{1.10}Ni_{0.30}Mn_{0.50}Mg_{0.05}Ti_{0.05}O_2$ Cell.

FIG. 3D shows the cycle life performance (Cathode Specific Capacity [mAh/g] versus Cycle Number) for the Hard Carbon// $Na_{1.10}Ni_{0.30}Mn_{0.50}Mg_{0.05}Ti_{0.05}O_2$ cell. The cell shows good reversibility.

Referring to FIGS. 4A, 4B, 4C and 4D.

The data shown in FIGS. 4A, 4B, 4C and 4D are derived from the constant current cycling data for a $Na_{1.05}Ni_{0.40}Mn_{0.50}Mg_{0.025}Ti_{0.025}O_2$ active material in a Na-ion cell where this cathode material was coupled with a Hard Carbon (Carbotron P/J) anode material. The electrolyte used is a 0.5 M solution of $NaClO_4$ in propylene carbonate. The constant current data were collected at an approximate current density of 0.10 mA/cm² between voltage limits of 1.50 and 4.00 V. To charge the Na-ion cell fully, it was potentiostatically held at 4.0 V at the end of the constant current charging process until the current density dropped to 20% of the constant current value. The testing was carried out at room temperature. During the cell charging process, sodium ions are extracted from the cathode active material, and inserted into the Hard Carbon anode. During the subsequent discharge process, sodium ions are extracted from the Hard Carbon and re-inserted into the cathode active material.

Figure 4A:
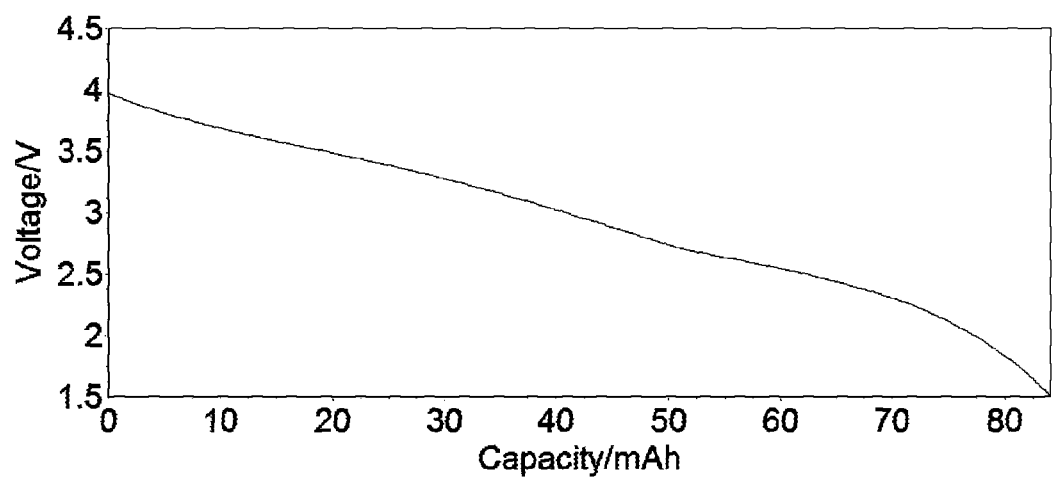
FIG. 4(A) relates to a Na-ion Cell and shows the third Cycle Discharge Voltage Profile (Na-ion Cell Voltage [V] versus Cathode Specific Capacity [mAh/g]) for a Hard Carbon//$Na_{1.05}Ni_{0.40}Mn_{0.50}Mg_{0.025}Ti_{0.025}O_2$ Cell.

FIG. 4A shows the third cycle discharge voltage profile (Na-ion Cell Voltage [V] versus Cathode Specific Capacity [mAh/g]) for the Hard Carbon//$Na_{1.05}Ni_{0.40}Mn_{0.50}Mg_{0.025}Ti_{0.025}O_2$ cell. The cathode specific capacity in this cycle corresponds to 84 mAh/g.

Figure 4B:
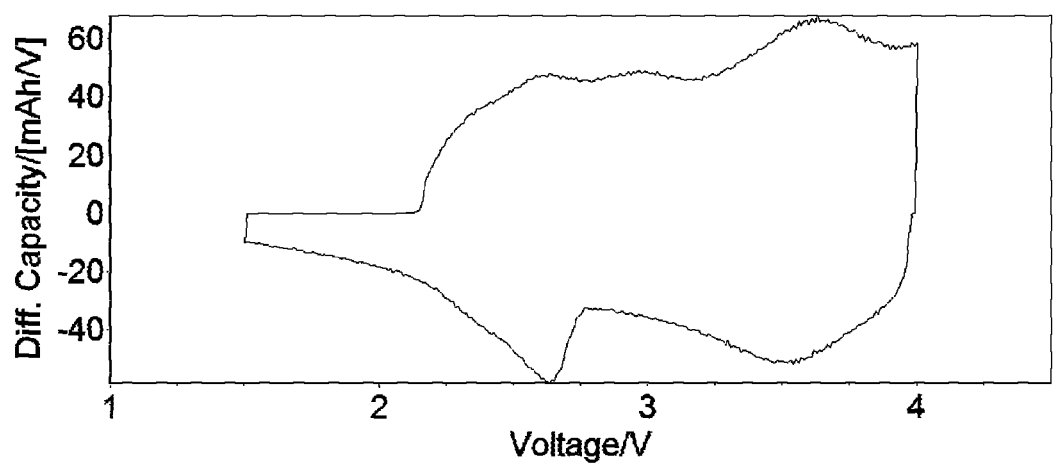
FIG. 4(B) relates to a Na-ion Cell and shows the third Cycle Differential Capacity Profiles (Differential Capacity [mAh/g/V] versus Na-ion Cell Voltage [V]) for a Hard Carbon//$Na_{1.05}Ni_{0.40}Mn_{0.50}Mg_{0.025}Ti_{0.025}O_2$Cell.

FIG. 4B shows the third cycle differential capacity profiles (Differential Capacity [mAh/g/V] versus Na-ion Cell Voltage [V]) for the Hard Carbon//$Na_{1.05}Ni_{0.40}Mn_{0.50}Mg_{0.025}Ti_{0.025}O_2$ cell. These symmetrical data demonstrate the excellent reversibility of the ion extraction-insertion reactions in this Na-ion cell.

Figure 4C:
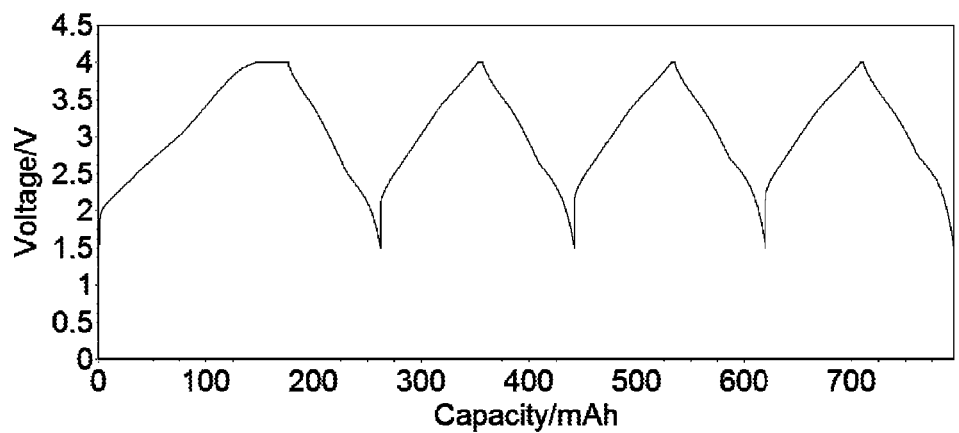
FIG. 4(C) relates to a Na-ion Cell and shows the Charge-Discharge Voltage Profiles for first 4 cycles (Na-ion Cell Voltage [V] versus Cumulative Cathode Specific Capacity [mAh/g]) for a Hard Carbon//$Na_{1.05}Ni_{0.40}Mn_{0.50}Mg_{0.025}Ti_{0.025}O_2$ Cell.

FIG. 4C shows the first four charge-discharge cycles (Na-ion Cell Voltage [V] versus Cumulative Cathode Specific Capacity [mAh/g]) for the Hard Carbon//$Na_{1.05}Ni_{0.40}Mn_{0.50}Mg_{0.025}Ti_{0.025}O_2$ cell. These data demonstrate that the level of voltage hysteresis (i.e. the voltage difference between the charge and discharge processes) is extremely small, indicating the excellent kinetics of the extraction-insertion reactions.

Figure 4D:
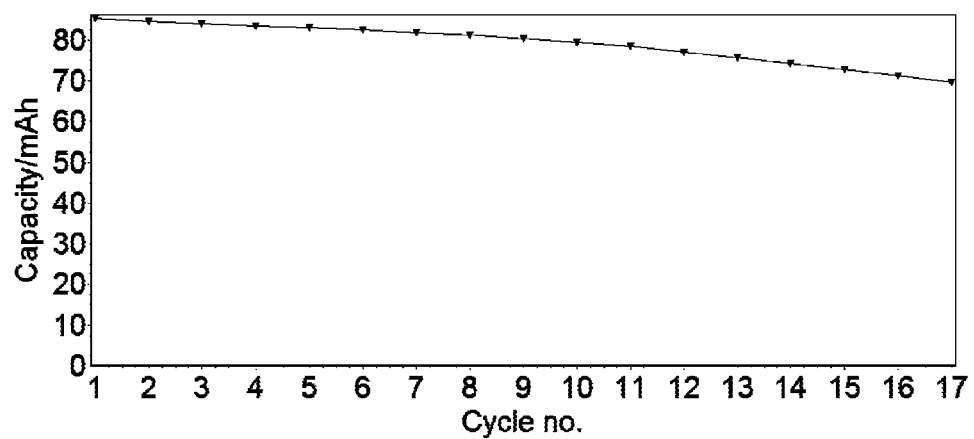
FIG. 4(D) relates to a Na-ion Cell and shows the Cycle Life Performance (Cathode Specific Capacity [mAh/g] versus Cycle Number) for a Hard Carbon//$Na_{1.05}Ni_{0.40}Mn_{0.50}Mg_{0.025}Ti_{0.025}O_2$ Cell.

FIG. 4D shows the cycle life performance (Cathode Specific Capacity [mAh/g] versus Cycle Number) for the Hard Carbon//$Na_{1.05}Ni_{0.40}Mn_{0.50}Mg_{0.025}Ti_{0.025}O_2$ cell. The cell shows good reversibility.

Referring to FIGS. 5A, 5B, 5C and 5D

The data shown in FIGS. 5A, 5B, 5C and 5D are derived from the constant current cycling data for a $Na_{1.05}Ni_{0.425}Mn_{0.525}O_2$ active material in a Na-ion cell where this cathode material was coupled with a Hard Carbon (Carbotron P/J) anode material. The electrolyte used is a 0.5 M solution of $NaClO_4$ in propylene carbonate. The constant current data were collected at an approximate current density of 0.10 mA/cm² between voltage limits of 1.50 and 4.00 V. To charge the Na-ion cell fully, it was potentiostatically held at 4.0 V at the end of the constant current charging process until the current density dropped to 20% of the constant current value. The testing was carried out at room temperature. During the cell charging process, sodium ions are extracted from the cathode active material, and inserted into the Hard Carbon anode. During the subsequent discharge process, sodium ions are extracted from the Hard Carbon and re-inserted into the cathode active material.

Figure 5A:
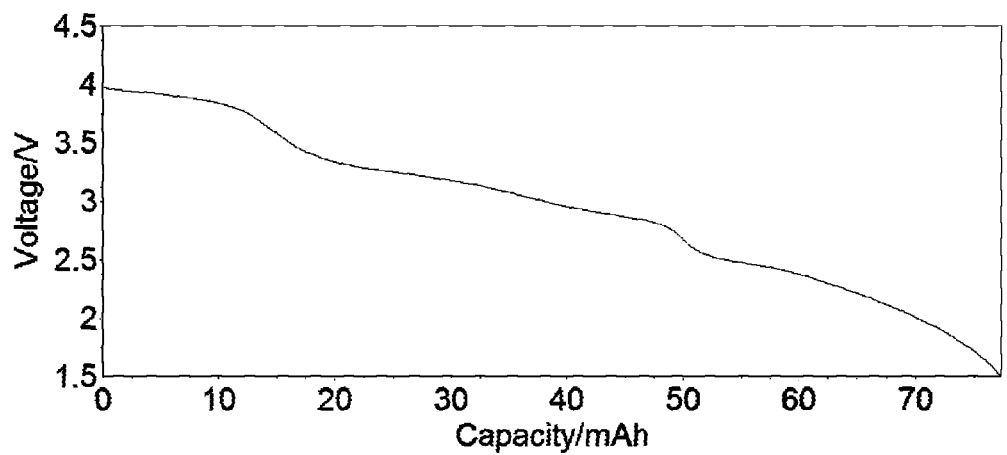
FIG. 5(A) relates to a Na-ion Cell and shows the First Cycle Discharge Voltage Profile (Na-ion Cell Voltage [V] versus Cathode Specific Capacity [mAh/g]) for a Hard Carbon//$Na_{1.05}Ni_{0.425}Mn_{0.525}O_2$ Cell.

FIG. 5A shows the first cycle discharge voltage profile (Na-ion Cell Voltage [V] versus Cathode Specific Capacity [mAh/g]) for the Hard Carbon//$Na_{1.05}Ni_{0.425}Mn_{0.525}O_2$ cell. The cathode specific capacity in this cycle corresponds to 77 mAh/g.

Figure 5B:
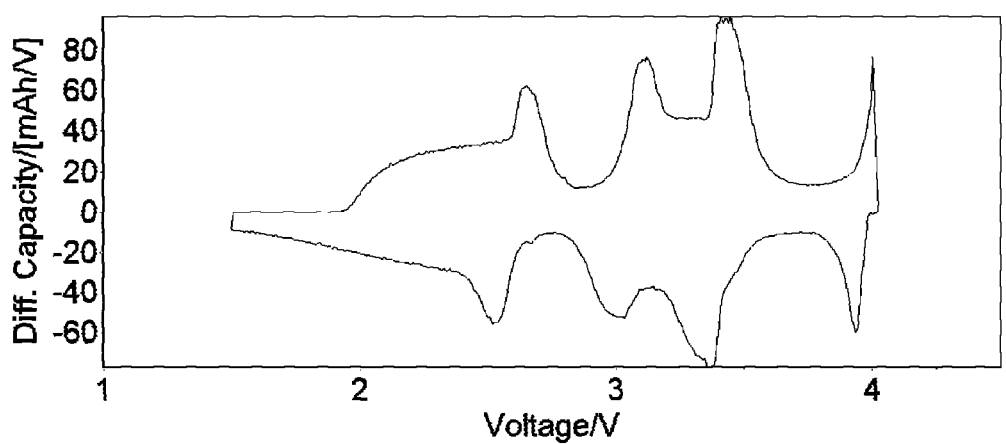
FIG. 5(B) relates to a Na-ion Cell and shows Second Cycle Differential Capacity Profiles (Differential Capacity [mAh/g/V] versus Na-ion Cell Voltage [V]) for a Hard Carbon//$Na_{1.05}Ni_{0.425}Mn_{0.525}O_2$ Cell.

FIG. 5B shows the second cycle differential capacity profiles (Differential Capacity [mAh/g/V] versus Na-ion Cell Voltage [V]) for the Hard Carbon//$Na_{1.05}Ni_{0.425}Mn_{0.525}O_2$ cell. These symmetrical data demonstrate the excellent reversibility of the ion extraction-insertion reactions in this Na-ion cell.

Figure 5C:
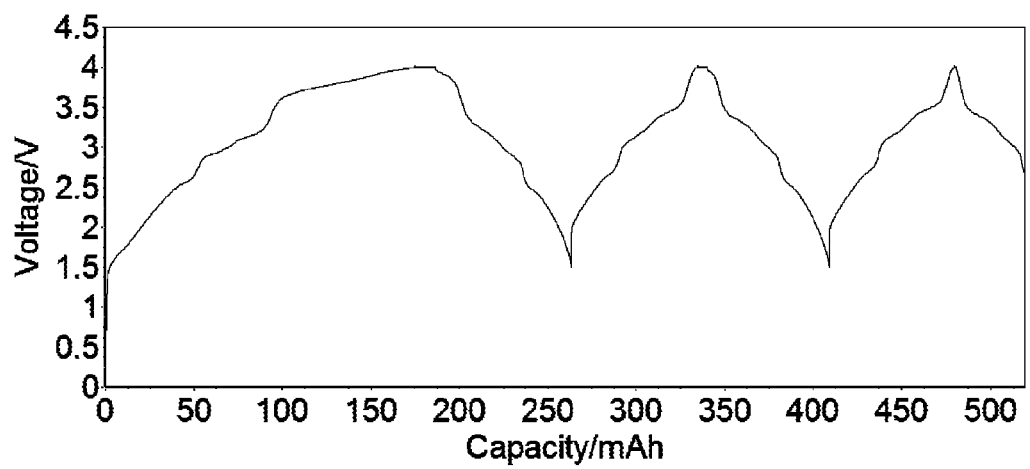
FIG. 5(C) relates to a Na-ion Cell and shows Charge-Discharge Voltage Profiles for first 3 cycles (Na-ion Cell Voltage [V] versus Cumulative Cathode Specific Capacity [mAh/g]) for a Hard Carbon//$Na_{1.05}Ni_{0.425}Mn_{0.525}O_2$ Cell.

FIG. 5C shows the first three charge-discharge cycles (Na-ion Cell Voltage [V] versus Cumulative Cathode Specific Capacity [mAh/g]) for the Hard Carbon//$Na_{1.05}Ni_{0.425}Mn_{0.525}O_2$ cell. These data demonstrate that the level of voltage hysteresis (i.e. the voltage difference between the charge and discharge processes) is extremely small, indicating the excellent kinetics of the extraction-insertion reactions.

Figure 5D:
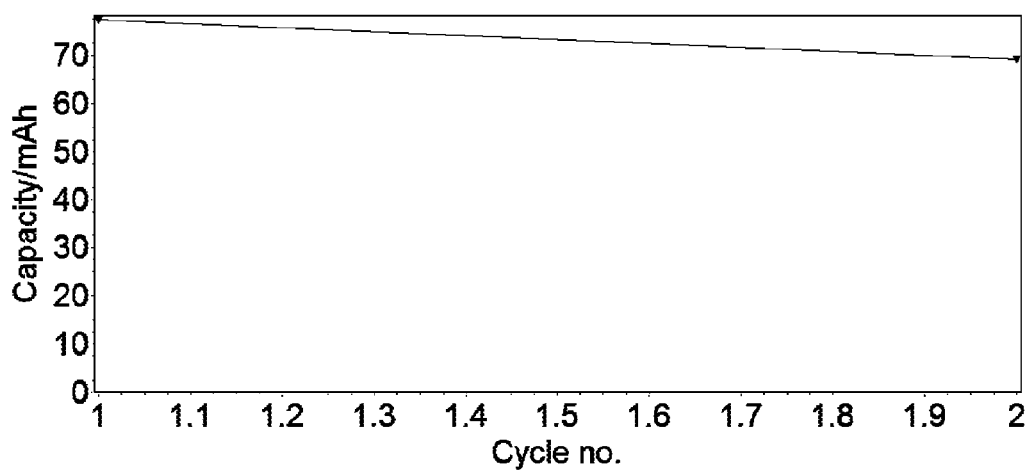
FIG. 5(D) relates to a Na-ion Cell and shows Cycle Life Performance (Cathode Specific Capacity [mAh/g] versus Cycle Number) for a Hard Carbon//$Na_{1.05}Ni_{0.425}Mn_{0.525}O_2$ Cell.
Figure 6A:
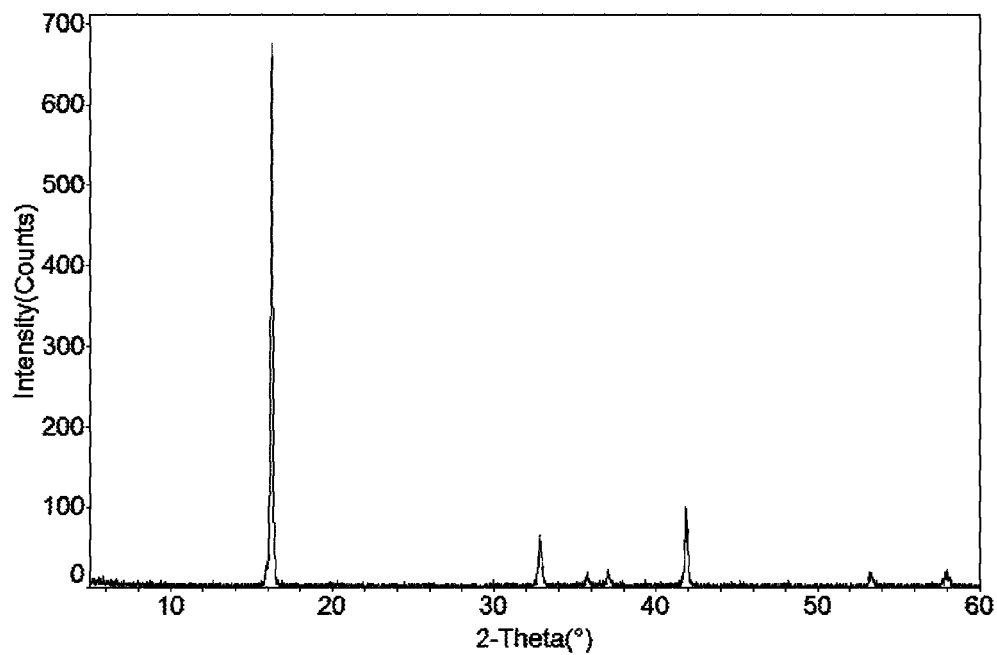
FIG. 6(A) is an XRD of $Na_{1.1}Ni_{0.3}Mn_{0.5}Mg_{0.05}Ti_{0.05}O_2$ prepared according to Example 1 of the present invention.
Figure 6B:
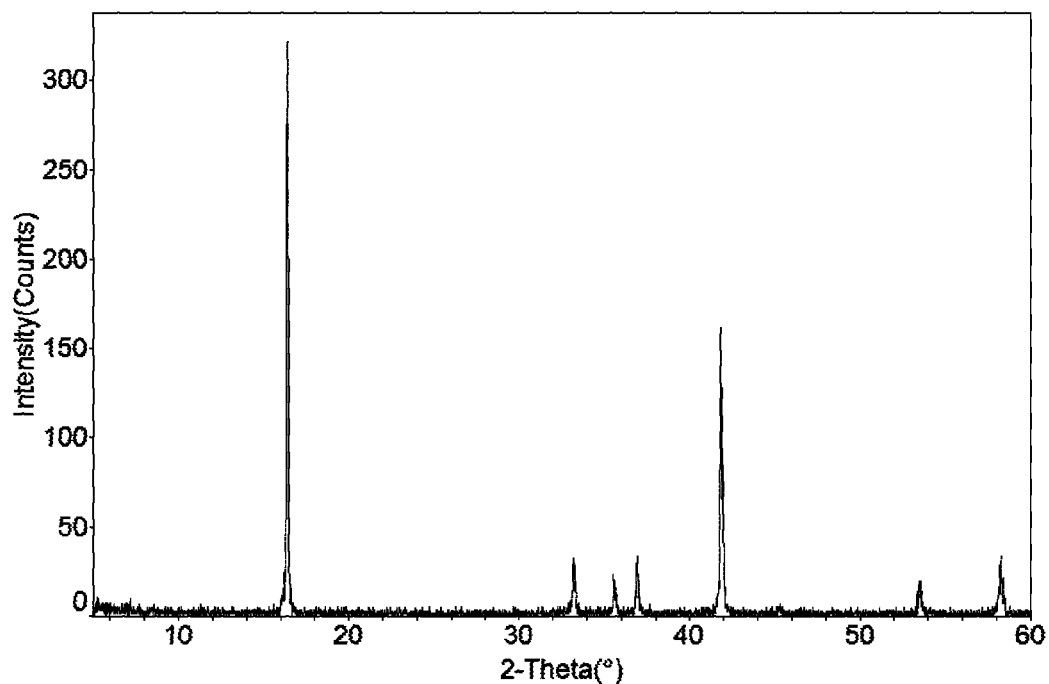
FIG. 6(B) is an XRD of $Na_{1.05}Ni_{0.4}Mn_{0.5}Mg_{0.025}Ti_{0.025}O_2$ prepared according to Example 2 of the present invention.

FIG. 5D shows the initial cycle life performance (Cathode Specific Capacity [mAh/g] versus Cycle Number) for the Hard Carbon//$Na_{1.05}Ni_{0.425}Mn_{0.525}O_2$ cell. The cell shows good reversibility.

The invention claimed is:

1. A compound of the formula:

$$A_U M^1_V M^2_W M^3_X M^4_Y M^5_Z O_2$$

wherein

A is one or more alkali metals selected from sodium and potassium;

$M^1$ is nickel in oxidation state +2

$M^2$ comprises a metal in oxidation state +4 selected from one or more of manganese, titanium and zirconium;

$M^3$ comprises a metal in oxidation state +2, selected from one or more of magnesium, calcium, copper, zinc and cobalt;

$M^4$ comprises a metal in oxidation state +4, selected from one or more of titanium, manganese and zirconium;

$M^5$ comprises a metal in oxidation state +3, selected from one or more of aluminum, iron, cobalt, molybdenum, chromium, vanadium, scandium and yttrium;

further wherein

U is in the range 1<U<2;

V is in the range 0.25<V<1;

W is in the range 0<W<0.75;

X is in the range 0<X<0.5;

Y is in the range 0≤Y<0.5;

Z is in the range 0≤Z<0.5;

and further wherein U+V+W+X+Y+Z≤3.

2. A compound according to claim 1 wherein U is in the range 1<U<1.5; V is in the range 0.25<V<1; W is in the range 0<W<0.75; X is in the range 0<X≤0.25; Y is in the range 0≤Y≤0.25; Z is in the range 0≤Z≤0.25.

3. A compound according to claim 1 of the formula:

$$Na_{1.1}Ni_{0.3}Mn_{0.5}Mg_{0.05}Ti_{0.05}O_2; \text{ or}$$
$$Na_{1.05}Ni_{0.4}Mn_{0.5}Mg_{0.025}Ti_{0.025}O_2.$$

4. An electrode comprising an active compound according to claim 1.

5. An electrode according to claim 4 used in conjunction with a counter electrode and one or more electrolyte materials.

6. An electrode according to claim 5 wherein the electrolyte material comprises an aqueous electrolyte material.

7. An electrode according to claim 5 wherein the electrolyte material comprises a non-aqueous electrolyte.

8. An energy storage device comprising an electrode according to claim 4.

9. An energy storage device according to claim 8 suitable for use as one or more of the following: a sodium and/or lithium and/or potassium ion cell; a sodium metal and/or lithium metal and/or potassium metal ion cell; non-aqueous electrolyte sodium ion and/or lithium ion and/or potassium ion cell, an aqueous electrolyte sodium ion and/or lithium ion and/or potassium ion cell.

10. A rechargeable battery comprising an electrode according to claim 4.

11. An electrochemical device comprising an electrode according to claim 4.

12. An electrochromic device comprising an electrode according to claim 4.

13. A method of preparing the compounds according to claim 1 comprising the steps of:
   a) mixing starting materials together;
   b) heating the mixed starting materials in a furnace at a temperature of between 400° C. and 1500° C., for between 2 and 20 hours to give a reaction product; and
   c) allowing the reaction product to cool.

* * * * *